(12) United States Patent
Lyon

(10) Patent No.: US 9,809,044 B1
(45) Date of Patent: Nov. 7, 2017

(54) MARKETING METHOD AND SYSTEM

(71) Applicant: U-Glove, Inc., Miramar, FL (US)

(72) Inventor: Antonio Lyon, Sunrise, FL (US)

( * ) Notice: Subject to any disclaimer, the term of this patent is extended or adjusted under 35 U.S.C. 154(b) by 422 days.

(21) Appl. No.: 14/260,973

(22) Filed: Apr. 24, 2014

Related U.S. Application Data

(60) Provisional application No. 61/815,903, filed on Apr. 25, 2013.

(51) Int. Cl.
*B42D 15/00* (2006.01)
*B65H 1/08* (2006.01)

(52) U.S. Cl.
CPC .............. *B42D 15/00* (2013.01); *B65H 1/08* (2013.01); *B42P 2221/06* (2013.01); *B65H 2402/43* (2013.01)

(58) Field of Classification Search
CPC . A41D 19/0055; B65D 85/18; B65D 83/0805
See application file for complete search history.

(56) References Cited

U.S. PATENT DOCUMENTS

| | | | |
|---|---|---|---|
| 3,229,875 A | 1/1966 | Stoller | |
| D222,582 S | 11/1971 | Petrie | |
| 3,872,515 A | 3/1975 | Miner et al. | |
| 4,034,853 A | 7/1977 | Smith | |
| 4,034,924 A | 7/1977 | Carlisle | |
| D255,179 S | 6/1980 | Peters | |
| 4,240,157 A | 12/1980 | Peters | |
| D275,345 S | 9/1984 | Hall | |
| 4,745,635 A | 5/1988 | Kinnear | |
| 4,791,682 A | 12/1988 | Herr et al. | |
| 4,918,755 A | 4/1990 | Kinnear | |
| 5,025,503 A | 6/1991 | O'Brien | |
| 5,173,966 A | 12/1992 | DeLeo | |
| 5,429,377 A | 7/1995 | Duer | |
| 5,467,481 A | 11/1995 | Srivastava | |
| 5,820,142 A | 10/1998 | Duer | |
| 5,966,741 A | 10/1999 | Klecina | |
| 6,021,919 A | 2/2000 | Kelly | |
| 6,336,568 B1 | 1/2002 | Tucker et al. | |
| 6,375,034 B1 | 4/2002 | Corbett | |
| 6,625,816 B1 | 9/2003 | Cooke | |
| 6,643,846 B2 | 11/2003 | Turner-Antonsen | |
| D482,915 S | 12/2003 | Yang et al. | |
| D483,207 S | 12/2003 | Winslow | |

(Continued)

*Primary Examiner* — Gary C Hoge
(74) *Attorney, Agent, or Firm* — Malloy & Malloy P.L.

(57) ABSTRACT

A marketing system implemented at one or more target sites having a contaminated user interface includes a plurality of sanitary glove assemblies each having at least one advertising indicia visibly displayed thereon, and which are provided to end users for use at the target site without charge. At least one dispenser assembly having an advertisement media support disposed at each target site proximate the contaminated user interface, and a replaceable advertising media displayed therein. Each dispenser assembly comprises a storage compartment dimensioned to contain at least some of the plurality of sanitary glove assemblies, and a dispensing aperture through which an end user can remove one or more of the plurality of sanitary glove assemblies, as needed. In at least one embodiment, a disposal assembly is provided proximate the dispenser assembly at the target site. A method for implementing the present system is also provided.

6 Claims, 10 Drawing Sheets

(56) References Cited

U.S. PATENT DOCUMENTS

| | | | |
|---|---|---|---|
| 6,691,873 B1* | 2/2004 | Healey | B65D 5/4254 |
| | | | 206/457 |
| 7,063,233 B2 | 6/2006 | Jordan et al. | |
| 7,222,817 B2 | 5/2007 | Stringer | |
| D670,113 S | 11/2012 | Morrison | |
| 8,419,024 B1* | 4/2013 | Arroyo-Ferrer | B62B 3/005 |
| | | | 280/47.35 |
| 8,701,932 B2 | 4/2014 | Reinsel et al. | |
| 2002/0040912 A1* | 4/2002 | McHugh | A61B 50/30 |
| | | | 221/45 |
| 2002/0113079 A1 | 8/2002 | Corbett | |
| 2005/0218612 A1 | 10/2005 | Malchow | |
| 2008/0016601 A1* | 1/2008 | McCrorey | A41D 19/0006 |
| | | | 2/159 |
| 2008/0072248 A1* | 3/2008 | Sosalla | G06Q 30/02 |
| | | | 725/34 |
| 2011/0186589 A1* | 8/2011 | Lee | B65H 3/00 |
| | | | 221/36 |
| 2012/0004761 A1* | 1/2012 | Madruga | G06Q 30/02 |
| | | | 700/214 |
| 2014/0260091 A1* | 9/2014 | Sacks | B65D 81/18 |
| | | | 53/397 |
| 2015/0230645 A1* | 8/2015 | Dennison | A47G 25/904 |
| | | | 221/1 |
| 2015/0230672 A1* | 8/2015 | Moskowitz | A47K 10/42 |
| | | | 221/303 |

* cited by examiner

MARKETING METHOD AND SYSTEM

BACKGROUND OF THE INVENTION

Field of the Invention

The present invention is directed to a marketing method and a marketing system whereby a sponsor of an advertising campaign funds the production of a plurality of sanitary glove assemblies which visibly display the sponsor's advertising indicia, and which are strategically placed in dispenser assemblies installed at one or more target sites throughout a campaign territory. End users, typically consumers, are permitted to utilize a pair of the sanitary glove assemblies bearing the sponsor's advertising without cost while conducting his or her transaction at the target site, thereby preventing the transmission of contaminants to the end user from the target site and simultaneously creating a positive advertising environment for the sponsor to convey its message to end users via at least its advertising indicia on the sanitary glove assemblies.

Description of the Related Art

It is well known that numerous contaminants are transferred to human beings through their day to day contact with other people, plants, animals, as well as many inanimate objects. These contaminants include bacteria, mold, and a number of viruses which are known to be responsible for the common cold and various forms of influenza, as well as more serious contaminants such as, by way of example, *E. coli*. Research has shown that viruses can live on the surface of inanimate objects anywhere with time periods ranging from one or two hours to upwards of one or two days.

The human rhinovirus was projected to cause over 560 million cases of the common cold in the United States alone in 2013. Cold and flu germs has shown potential survival times ranging from a few minutes to 48 hours or more on various surfaces. Further, it is well known that the common cold can lead to more serious infections, such as sinusitis, ear infections, and/or bronchitis. The virus was projected to infect over 200 million people in the United States in 2013, and the total estimated cost of the common cold in the United States in 2013 was expected to exceed 40 billion dollars.

A recent study conducted by Kimberly-Clark tested the surfaces of seven different objects in a half-dozen cities across the United States, including, Atlanta, Chicago, Dallas, Los Angeles, Miami, and Philadelphia. A total of seven different objects were tested in each city to measure levels of Adenosine Triphosphate ("ATP"). ATP is an organic molecule utilized by living cells as an energy source, and animal, plant, bacteria, yeast, mold cells produce and break down ATP in order to survive. As such, a measure of ATP provides an indication of the cleanliness of a surface, and a reading of greater than 300 represents a highly contaminated surface.

According to the results from testing performed by Kimberly-Clark, of the seven different common objects tested, over 70% of gas pump handles had an ATP reading greater than 300. Next were mail box handles at just under 70%, escalator rails, ATM buttons and parking meters/kiosk all around 40%, and cross walk and vending machine buttons at around 35%.

Thus, research has shown that gas pump handles are among the most contaminated surfaces that people commonly come into contact in their daily lives. However, it is also well known that very few people take time to wash or sanitize their hands after pumping gas, thus leading in the spread of viruses to other people either directly or through common contact with other surfaces. Research has shown that minor illnesses are readily preventable by simply breaking the chain of germ transmission.

At the present time, the primary means for addressing contamination from surfaces has been to recommend frequent hand washing, however, this has proven to be at best inconvenient, and in many cases, simply not an available option. More recently, a variety of sanitizing solutions in various forms of dispensers have become common, however, once again, consistent usage of the same is required in order to break the chain of germ transmission. Thus, as noted above, a preferred option is simply to prevent direct contact with potentially contaminated surfaces. This is accomplished through the use of various types of gloves which may be placed over a user's hand before coming into contact with a contaminated surface in order to avoid the transfer of any contaminants from the surface to the person's hands, where the contaminants can be further spread as the person goes about his or her day. Such gloves are commonly employed by doctors, dentists and other healthcare workers, and are being more commonly employed in other facets of our daily lives.

As such, it would be beneficial to society as a whole to provide a supply of sanitary gloves for people to utilize so as to avoid contact with potentially contaminated surfaces. It would be further beneficial to provide the supply of sanitary gloves to the general public without cost to the end users themselves. A further benefit may be realized by utilizing one or more surface of a sanitary glove on which to place advertising indicia, wherein the cost of providing the supply of sanitary gloves to the general public is born by the sponsor of the advertising campaign. It would further be helpful to provide a disposal assembly for discarded sanitary gloves at a target site, such that, discarded sanitary gloves can be periodically collected for disposal, or more preferably, for purposes of recycling. It would also be beneficial to society as a whole to provide a method whereby a sponsor of an advertising campaign funds the production of a plurality of sanitary glove assemblies which include the sponsor's advertising indicia and which are dispensed at target sites via a dispenser assembly which also prominently displays the sponsor's advertisement media. Yet one further benefit may be obtained by providing a user incentive in conjunction with one or more sanitary glove assembly which is provided without cost to an end user, once again, such as a consumer.

SUMMARY OF THE INVENTION

As previously stated, the present invention is directed to a marketing system implemented at one or more target sites having a contaminated user interface in a campaign territory. In one embodiment, the present marketing system comprises a plurality of sanitary glove assemblies each comprising a sanitary glove having an open end to facilitate placement on an end user's hand. Further, each of the plurality of sanitary glove assemblies comprise at least one advertising indicia visibly displayed thereon which conveys a message of a campaign sponsor regarding its products, services, and/or cause.

The present marketing system further comprises, in at least one embodiment, one or more dispenser assembly installed at each target site in a campaign territory, wherein each dispenser assembly is disposed proximate a contaminated user interface on the corresponding target site. In one further embodiment, each dispenser assembly comprises an advertisement media support structured to receive and display at least one replacement advertisement media therein, and the system includes a replaceable advertising media for display in the advertising media support. Similar to the advertising indicia on the sanitary glove assemblies, the replaceable advertisement media is utilized to convey a message regarding a campaign sponsor's products, services, and/or cause.

A dispenser assembly in accordance with at least one embodiment of the present invention comprises a storage compartment dimensioned to contain a plurality of sanitary glove assemblies, and in one further embodiment, the dispenser assembly comprises a dispensing aperture through which an end user can remove one or more of the plurality of sanitary glove assemblies having advertising indicia displayed thereon for use at a target site.

At least one embodiment of the marketing system in accordance with the present invention comprises at least one disposal assembly having a receptacle disposed proximate at least one dispenser assembly at a target site, wherein the receptacle is configured to receive a plurality of sanitary glove assemblies which are discarded by the end user after use at the target site. At least one further embodiment of the present marketing system includes a forced air unit utilized to facilitate removal of the sanitary glove assemblies from the end user's hands after sue, and transport of the discarded sanitary glove assemblies into the receptacle for storage, transport and/or recycling.

The present invention also comprises a marketing method implemented at a plurality of target sites. At least one embodiment of the marketing method comprises: funding an advertising campaign by a sponsor; producing a plurality of dispenser assemblies comprising at least one advertisement media support; contracting a plurality of target sites in a campaign territory on which to stage at least one of the plurality of dispenser assemblies; producing a plurality of sanitary glove assemblies comprising the sponsor's advertising indicia; staging at least one dispenser assembly at each target site proximate a contaminated user interface, wherein the at least one dispenser assembly comprises the sponsor's replaceable advertisement media and is supplied with a plurality of sanitary glove assemblies comprising the sponsor's advertising indicia; and, providing the plurality of sanitary glove assemblies comprising the sponsor's advertising indicia without charge for use by end users from each dispenser assembly.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION

As previously stated, the present invention comprises an innovative marketing system, generally shown as at 10 throughout the figures, and equally innovative marketing method, generally as shown as 100 throughout the figures, each of which is described in more detail below.

Figure 1:
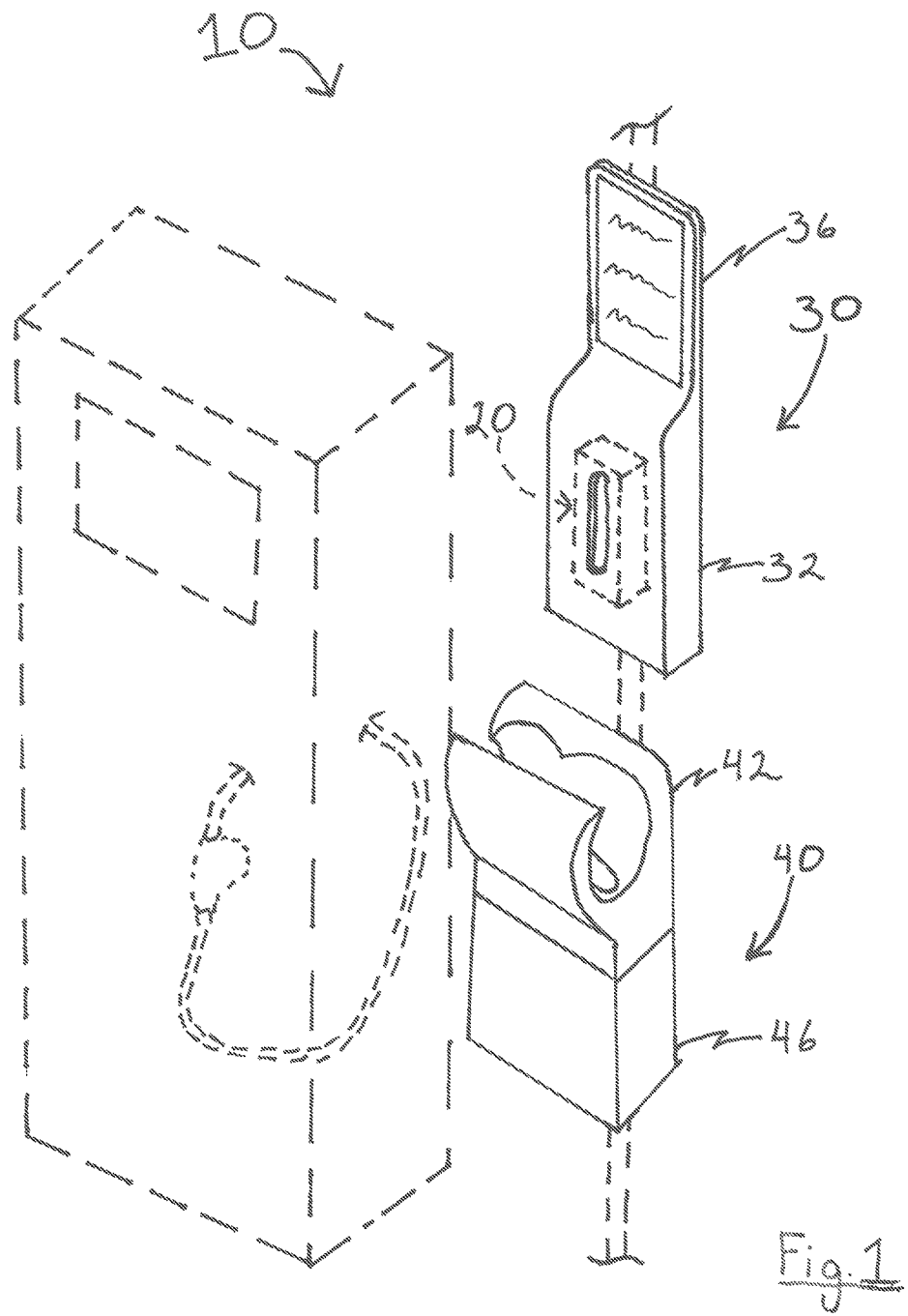
FIG. 1 is a schematic representation illustrative of one embodiment of a marketing system in accordance with the present invention.

A marketing system 10 in accordance with the present invention is presented schematically in FIG. 1. As may be seen from the illustrative embodiment of FIG. 1, the present marketing system 10 comprises at least one dispenser assembly 30 which is disposed at a target site which, as shown in the illustrative embodiment of FIG. 1, comprises a gasoline station. As previously discussed, gas pump handles are known to be among the most contaminated surfaces which people come into contact with on a daily basis, and thus constitute a contaminated interface in the context of the present application. As such, and once again, as may be seen from the illustrative embodiment of FIG. 1, the at least one dispenser assembly 30 is disposed at the target site proximate a contaminated interface, i.e., a gasoline pump handle.

Although the marketing system 10 as illustrated in FIG. 1 is shown in relation to the gasoline station, it is understood to be well within the scope of the intent of the present invention to implement the present marketing system 10 by deploying at least one dispenser assembly 30 proximate any of a number of other contaminated interfaces with which end users may contact on a daily basis including, but in no manner limited to, ATM machines, convenient stores, grocery stores, hospitals, fast food chains, bus, subway and train stations, and/or pet sanitation stations, just to name a few. Stated otherwise, the present marketing system 10 can be effectively implemented at any location where end users are likely to come into physical contact with one or more contaminated interface on a regular basis.

Looking again to the illustrative embodiment of the marketing system 10 in FIG. 1, the system 10 further comprises a plurality of sanitary glove assemblies 20 which are contained within dispenser assembly 30. Further, and again as illustrated in FIG. 1, at least one embodiment of the innovative marketing system 10 in accordance with the present invention further comprises a disposal assembly 40, which is positioned at a target site proximate to dispenser assembly 30. In at least one embodiment, disposal assembly 40 comprises a forced air unit 42, which is discussed in further detail below, as well as a receptacle 46 which is dimensioned to receive a plurality of sanitary glove assemblies 20 which are discarded after use.

Figure 3:
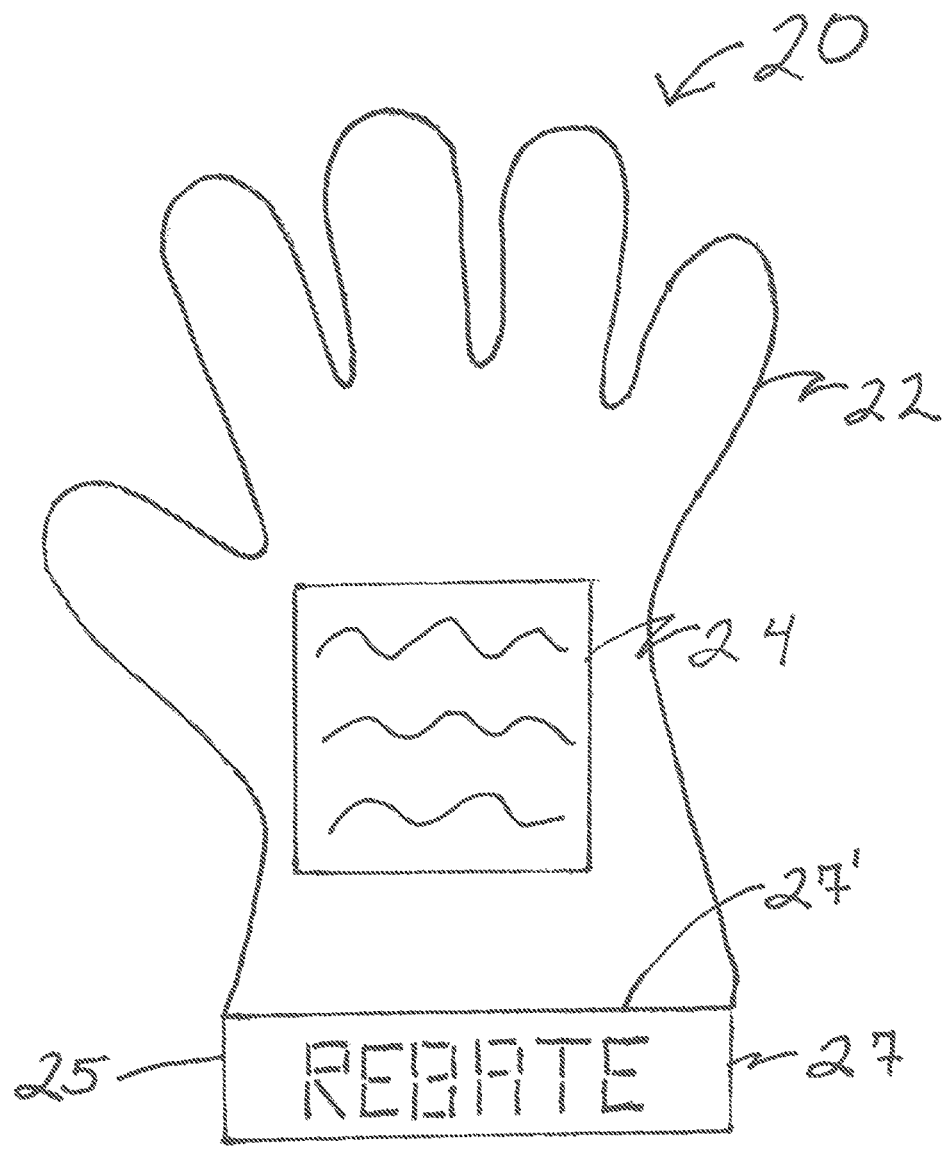
FIG. 3 is a plan view illustrative of one embodiment of a sanitary glove assembly comprising a detachable user incentive in accordance with the present invention.
Figure 4:
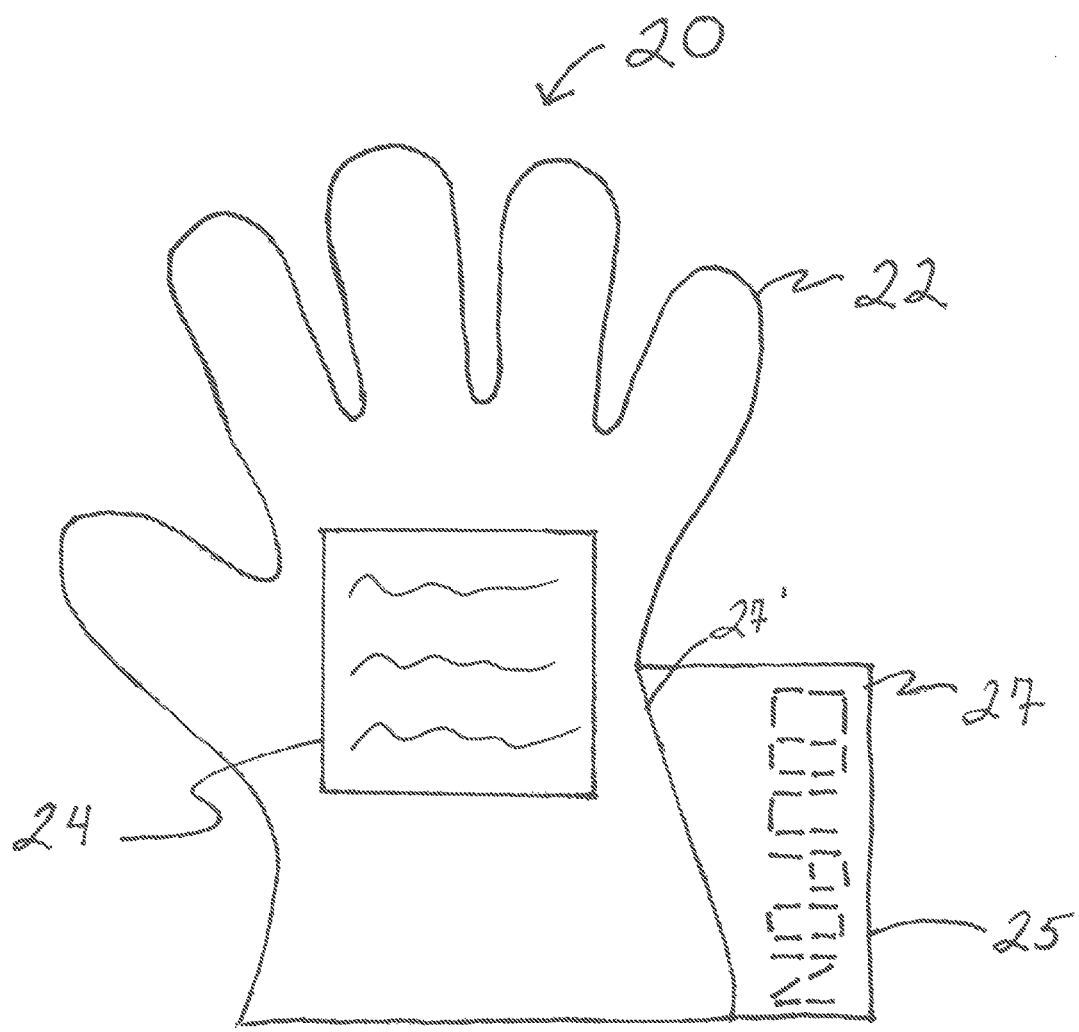
FIG. 4 is a plan view illustrative of another embodiment of a sanitary glove assembly comprising a detachable user incentive in accordance with the present invention.

As stated above, a marketing system 10 in accordance with the present invention comprises at least one sanitary glove assembly 20, and, in at least one further embodiment, a plurality of sanitary glove assemblies 20. Each sanitary glove assembly comprises a sanitary glove 22 such as is shown in the illustrative embodiment of FIGS. 2 through 4. As may be seen from FIG. 2 the sanitary glove 22 comprises an open end 23 opposite the finger portions thereof in order to permit a user too quickly and easily position the sanitary glove 22 onto and over his or her hand prior to contacting a contaminated interface. Although shown throughout the illustrative embodiments in a standard five finger glove configuration, a "sanitary glove" 20 as used herein is defined to include other configurations of hand coverings including but not limited to standard mittens, thumb-less mittens, etc.

A sanitary glove 22 in accordance with the present invention may be inexpensively manufactured from polypropylene, polyethylene, polyester, latex, etc., or any equivalent material of construction which provides the advantages of ease is manufacture and printability with minimal expense and/or is capable of being recycled in order to offset the cost of production of additional sanitary glove assemblies 20 in accordance with the marketing system 10 of the present invention.

Figure 2:
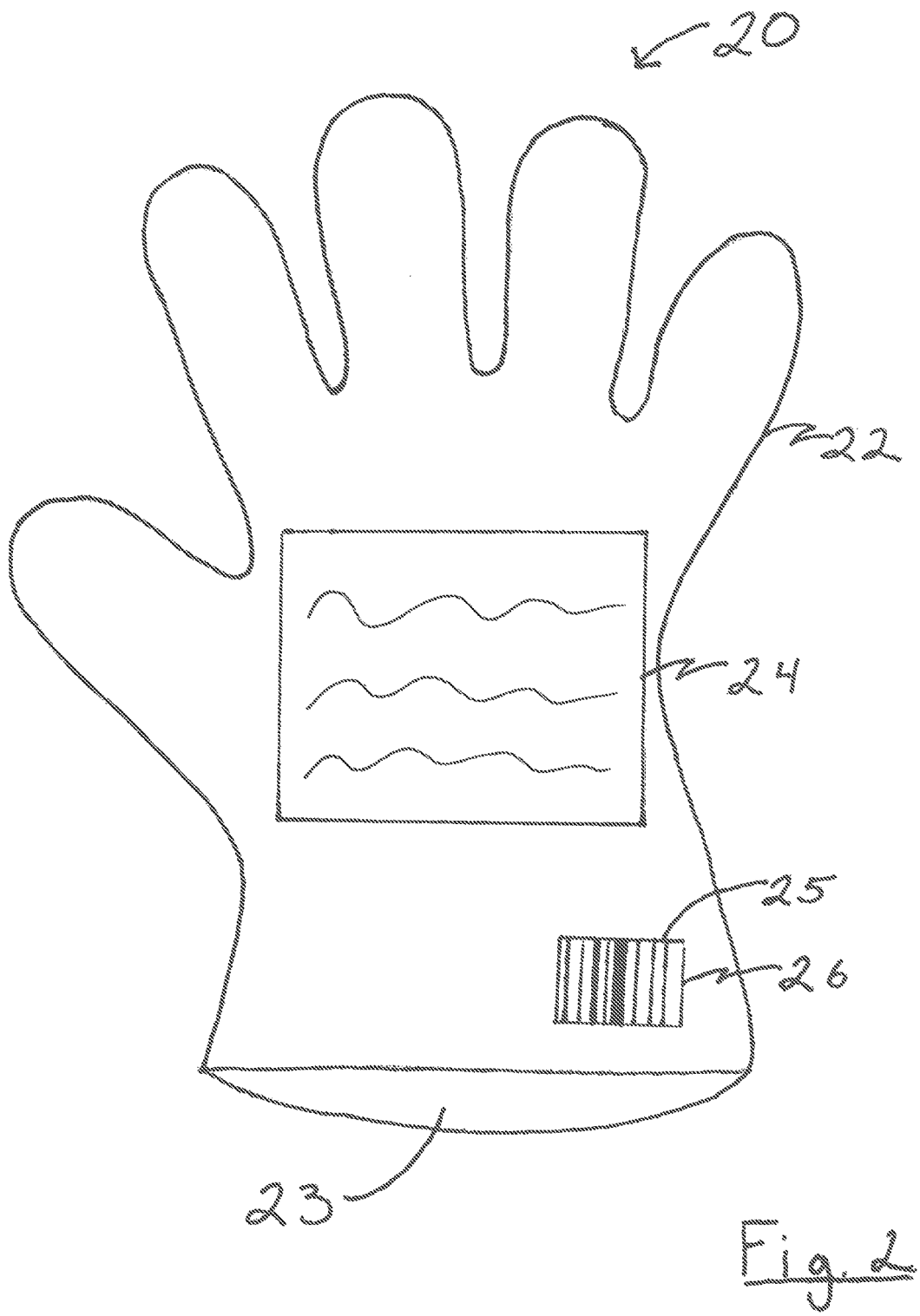
FIG. 2 is a plan view illustrative of one embodiment of a sanitary glove assembly comprising an optically readable user incentive in accordance with the present invention.

As also shown in FIG. 2, a sanitary glove assembly 20 in accordance with at least one embodiment of the present invention comprises at least one advertising indicia 24. The advertising indicia 24 can be any combination of words, images, color schemes, phone numbers, addresses, URL's, etc., such as are utilized by a campaign sponsor to promote his or her product, service, and/or cause. In one embodiment, the advertising indicia 24 covers a select portion of a sanitary glove 22, such as, the back of the hand portion. However, it will be appreciated by those skilled in the art, that in view of present printing techniques, the advertising indicia 24 may encompass the entire back surface of the sanitary glove 22 or any portion thereof, or the entire front surface of the sanitary glove 22 or any portion thereof, or both.

In addition to or in conjunction with the advertising indicia 24 which is disposed along at least a portion of the surface of the sanitary glove 22, a sanitary glove assembly 20 in accordance with at least one embodiment of the present invention further comprises a user incentive 25 which may be in the form of a refund, rebate, discount, etc., which the end user may redeem on his or her next purchase of the product, service and/or cause associated with the campaign sponsor's goals.

In at least one embodiment, and as shown best in the illustrative embodiment FIG. 2, a sanitary glove assembly 20 in accordance with the present invention comprises an optically readable user incentive 26, such as a barcode, quick response code, or any other such optically readable user incentive 26. Alternatively, or in conjunction with an optically readable user incentive 26, in at least one embodiment, a sanitary glove assembly 20 in accordance with the present invention comprises a detachable user incentive 27 which, once again, may comprise a coupon, refund, and/or discount for the campaign sponsor's products and/or services, which a user may remove prior to use of a sanitary glove assembly 20 in accordance with the present marketing system, and which the end user may redeem either on the spot, such as a discount for soda or snacks or other items from a convenient store which are common at gasoline stations, or which may be redeemed by the end user at his or her convenience at a later date. A detachment score 27' may be formed in the sanitary glove 22 itself, to facilitate removal of one or more detachable user incentive 27 for the sanitary glove assembly 20.

In yet one further embodiment, a user incentive 25 may be associated with the products or services of the target site, while the advertising indicia 24 on the surface of the sanitary glove assembly 20 itself corresponds to the campaign sponsor, or vice versa.

Figure 5:
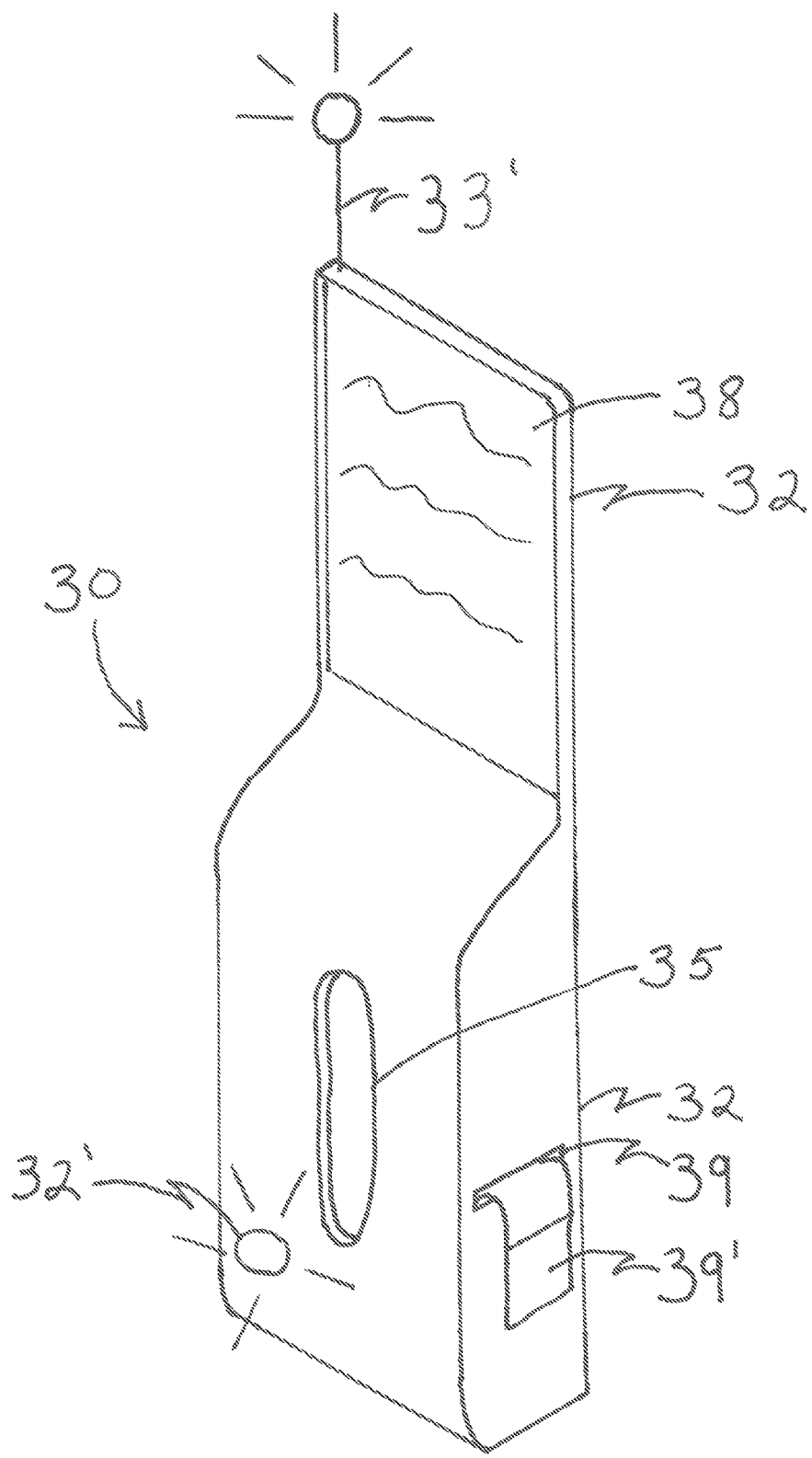
FIG. 5 is a perspective view illustrative of one embodiment of a dispenser assembly in accordance with the present invention.

In addition to a plurality of sanitary glove assemblies 20, a marketing system 10 in accordance with the present invention further comprises a dispenser assembly 30, such as is shown, once again, in the illustrative embodiment of FIG. 1. FIG. 5 presents a perspective view of one illustrative embodiment of a dispenser assembly 30 in accordance with the present invention. As shown in FIG. 5, the dispenser assembly 30 comprises a storage compartment 32. More in particular, storage compartment 32 of the dispenser assembly 30 is dimensioned to contain at least some of the plurality of sanitary glove assemblies 20. In at least one embodiment, a dispenser assembly 30 comprises at least one advertisement media support 36. More in particular, an advertisement media support 36 is dimensioned and configured to receive and display at least one replaceable advertisement media 38 which, similar to the advertising indicia 24 of a sanitary glove assembly 20, may comprise any combination of words, images, color schemes, phone numbers, addresses, URL's, etc., which the campaign sponsor wishes to convey to the end users at the target site about the sponsor's products, services, and/or cause. A replaceable advertising media 38 may be simple printed paper or cardboard stock, or weatherproof material such as a plastic or plastic coated material. As shown in FIG. 5, the dispenser assembly 30 further comprises a dispensing aperture 35 through which an end user can access and remove one or more sanitary glove assembly 20 contained therein.

FIG. 5 is also illustrative of an embodiment of a dispenser assembly 30 in accordance with the present invention including a coupon dispenser 39 incorporated therein. As may be seen from FIG. 5, the coupon dispenser 39 is utilized to provide the end user with a standalone user incentive 39' which, as before, may be in the form of a refund, rebate, discount, etc., which the end user may redeem immediately or on his or her next purchase of the product, service and/or cause associated with the campaign sponsor's goals.

As also shown via the illustrative embodiment of FIG. 5, in at least one embodiment, the dispenser assembly 30 further comprises a motion detector/indicator 32'. More in particular, the motion detector/indicator 32' is mounted to or immediately adjacent the dispenser assembly 30 and is actuated by the movement of a person approaching a gasoline pump or other location having a contaminated surface in which a dispenser assembly 30 is installed. When actuated, the motion detector/indicator 32' provides an audio and/or visual indication, so as to alert the person to the presence of the dispenser assembly 30, and more importantly, to the advertisement media and sanitary glove assemblies 20 therein. As one example, an audio signal may be a beep, buzz, etc., and/or it may include a person's voice reminding the end user to don the sanitary gloves 22. A visual signal, by way of example, may comprise a flashing light or series of flashing lights in order to attract an end user's attention to the dispenser assembly 30, as noted above.

Figure 6:
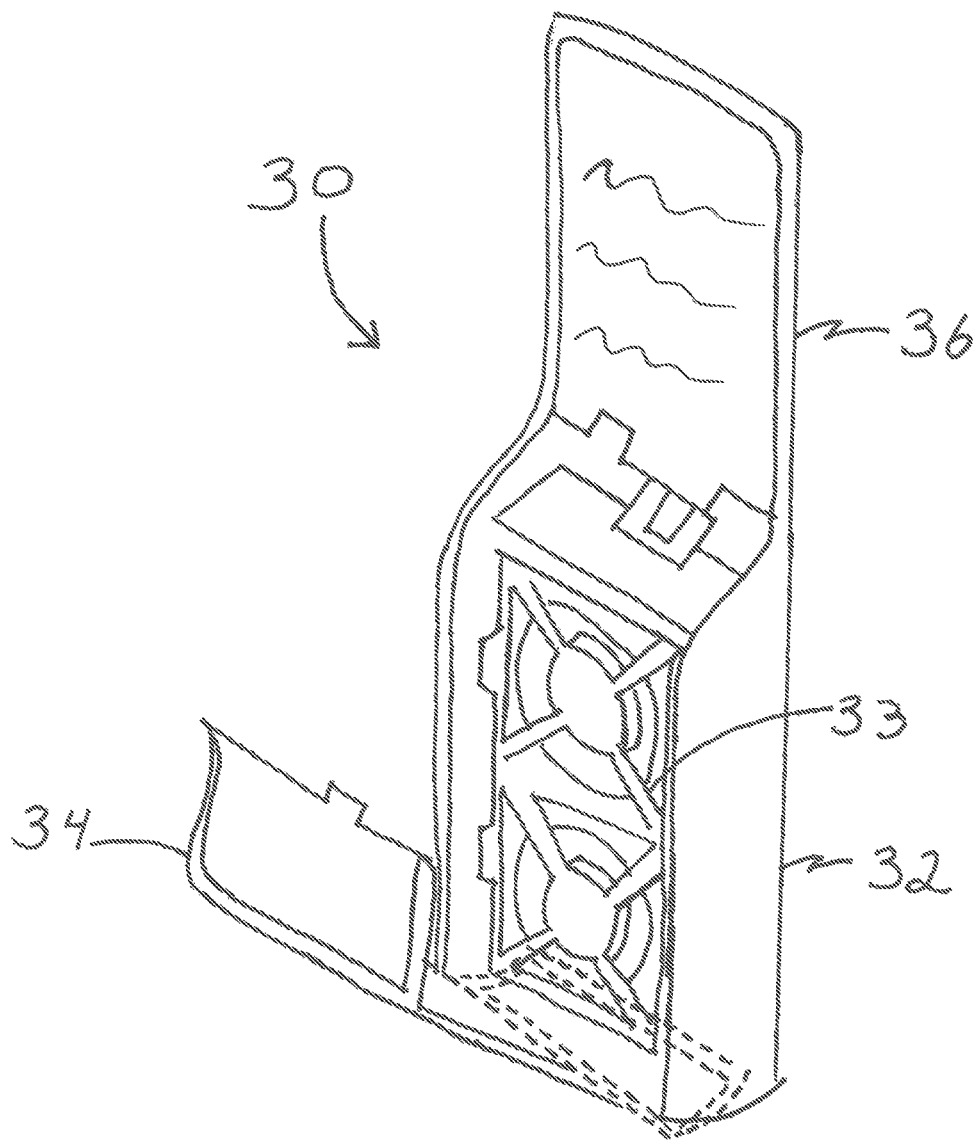
FIG. 6 is a perspective view of the dispenser assembly of FIG. 5 in an open configuration.

FIG. 6 is illustrative of one embodiment of a dispenser assembly 30 in accordance with the present invention having a service door 34 disposed in an open configuration so as to allow access to the interior of the storage compartment 32 for servicing, i.e., in order to supply or resupply a plurality of sanitary glove assemblies 20 therein. FIG. 6 is further illustrative of at least one embodiment of a biasing unit 33 disposed in the interior of the storage compartment 32 of the dispenser assembly 30. In at least one embodiment, the biasing unit 33 is structured to retain a box containing a plurality of sanitary glove assemblies 20 in an operative orientation relative to dispensing aperture 35, such that end users can access the plurality of sanitary glove assemblies 20 through dispensing aperture 35, as noted above. Alternatively, the plurality of sanitary glove assemblies 20 may be packaged in a collapsible container, and the biasing unit 33 serves to maintain sufficient force against the collapsible container in order to advance succeeding ones of the plurality of sanitary glove assemblies 20 towards dispensing aperture 35, once again, such that an end user can readily access one or more of a plurality of sanitary glove assemblies 20 through the dispensing aperture 35 of the dispenser assembly 30.

In accordance with at least one further embodiment of the present invention, and as shown in the illustrative embodiment of FIG. 5, a dispenser assembly 30 includes a sensor/transmitter assembly 33'. First, the sensor/transmitter assembly 33' monitors the stock of sanitary glove assemblies 20 present in the dispenser assembly 30. As will be appreciated, the stock of sanitary glove assemblies 20 present in the dispenser assembly 30 can be accomplished by a variety of means, at least one of which may operate in conjunction with the biasing unit. Alternatively, a differential weight measurement may be monitored, or a counter indicator through the dispensing aperture 35 which indicates when a sanitary glove assembly 20 is removed therethrough, such as via a light beam sensor, may be utilized. In at least one embodiment, the sensor/transmitter assembly 33' monitors the opening and closing of the service door 34 of the dispenser assembly 30 as an indication that an amount of sanitary glove assemblies 20 have been replenished.

Further, the sensor/transmitter assembly 33' transmits data regarding the stock of sanitary glove assemblies 20 to a remote monitoring center (not shown), wherein data is compiled for the campaign sponsor's use. For example, in at least one embodiment, the sensor/transmitter assembly 33' transmits a signal each time a sanitary glove assembly 20 is removed from a corresponding dispenser assembly 20, thereby allowing the campaign sponsor to obtain essentially real time data regarding the number and location in which its campaign message is being conveyed to end user's. As will be appreciated, this data may be obtained and/or compiled on a less frequent basis, for example, daily, weekly, monthly, or even quarterly, depending on any particular campaign sponsor's wants or needs. In another embodiment, the sensor/transmitter assembly 33' transmits a signal to a remote monitoring center to indicate it is in need of servicing, for example, to replenish a stock of sanitary glove assemblies 20, and in one further embodiment, the sensor/transmitter assembly 33' transmits a signal to an on-site monitor (not shown) so that the servicing may be accomplished by on-site personnel, for example, gasoline station employees.

Figure 7:
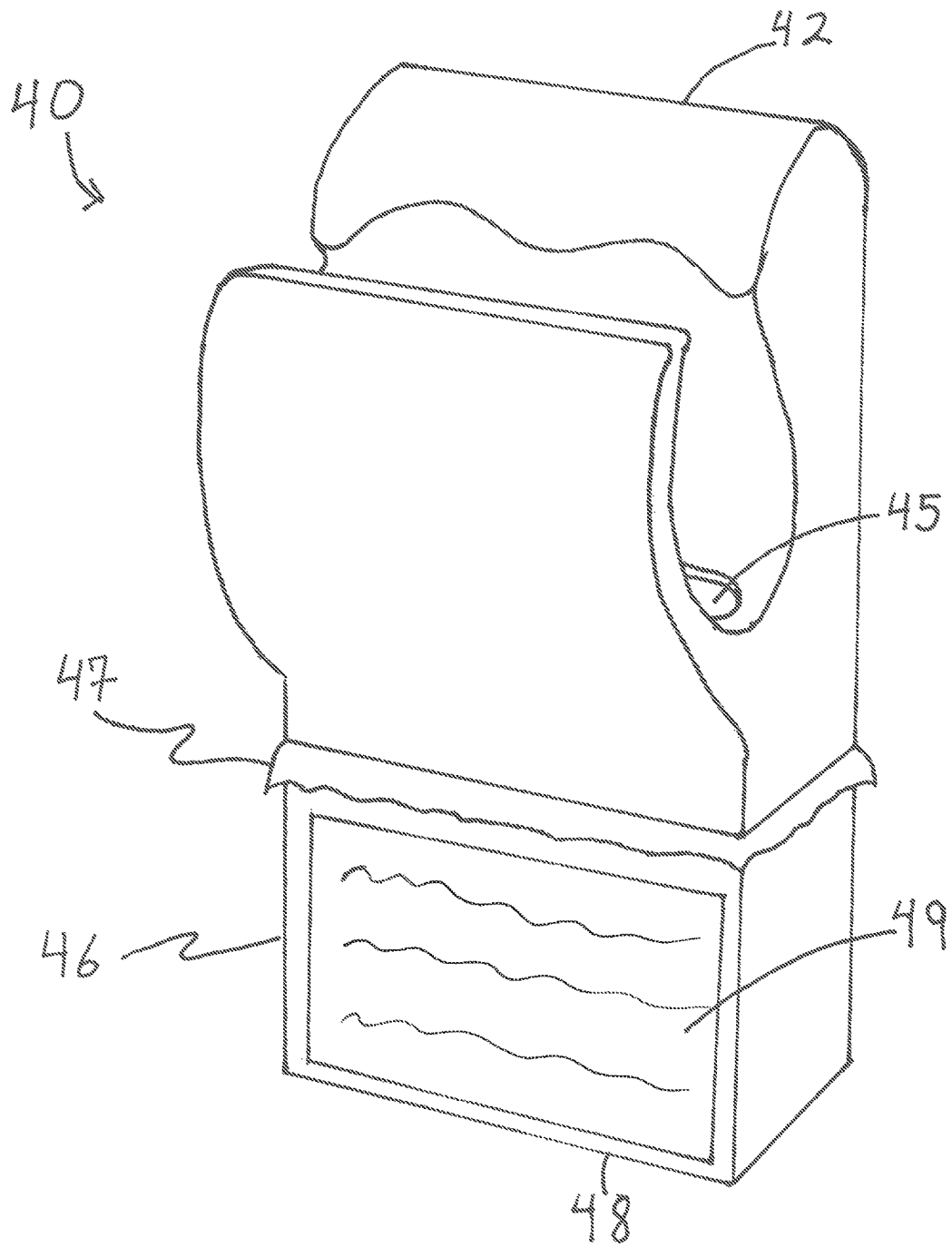
FIG. 7 is a perspective view illustrative of one embodiment of a disposal assembly in accordance with the present invention.

Looking again to FIG. 1, in at least one embodiment, the marketing system 10 in accordance with the present invention comprises a disposal assembly 40. As may be seen from FIG. 1, at least one embodiment of disposal assembly 40 comprises a forced air unit 42 and a receptacle 46. FIG. 7 is a perspective view of one illustrative embodiment of a disposal assembly 40 in accordance with the present invention. As may be seen from FIG. 7, and as stated above, a disposal assembly 40, in at least one embodiment, comprises a receptacle 46 which is dimensioned and disposed to receive a plurality of sanitary glove assemblies 20 therein, which are discarded after use. In at least one embodiment, a removable liner may be placed inside of the receptacle 46, in order to facilitate removal and subsequent handling of the discarded sanitary glove assemblies 20.

As further illustrated in FIG. 7, the disposal assembly 40 comprises a forced air unit 42. In at least one embodiment, the forced air unit 42 is similar to a hand drying device which is often placed in public restrooms where a person inserts his or her hands between the opposing side walls of the forced air unit 42 thereby actuating the forced air unit 42, and blowing air in a downward direction in order to displace excess liquid from a person's hand or hands. As such, in at least one embodiment of a disposal assembly 40 in accordance with the present invention, forced air unit 42 comprises an actuation sensor 43 which is structured to actuate the forced air unit 42 when an end user places his or her hand or hands into an operative orientation in the forced air unit 42. In at least one embodiment, the actuation sensor 43 comprise an optical sensor which actuates the forced air unit 42 when a light beam is broken by a solid object placed in its path, such as is shown by way of example in FIG. 8. As further illustrated in FIG. 7 the forced air unit 42 of disposal assembly 40 is positioned above receptacle 46.

Figure 8:
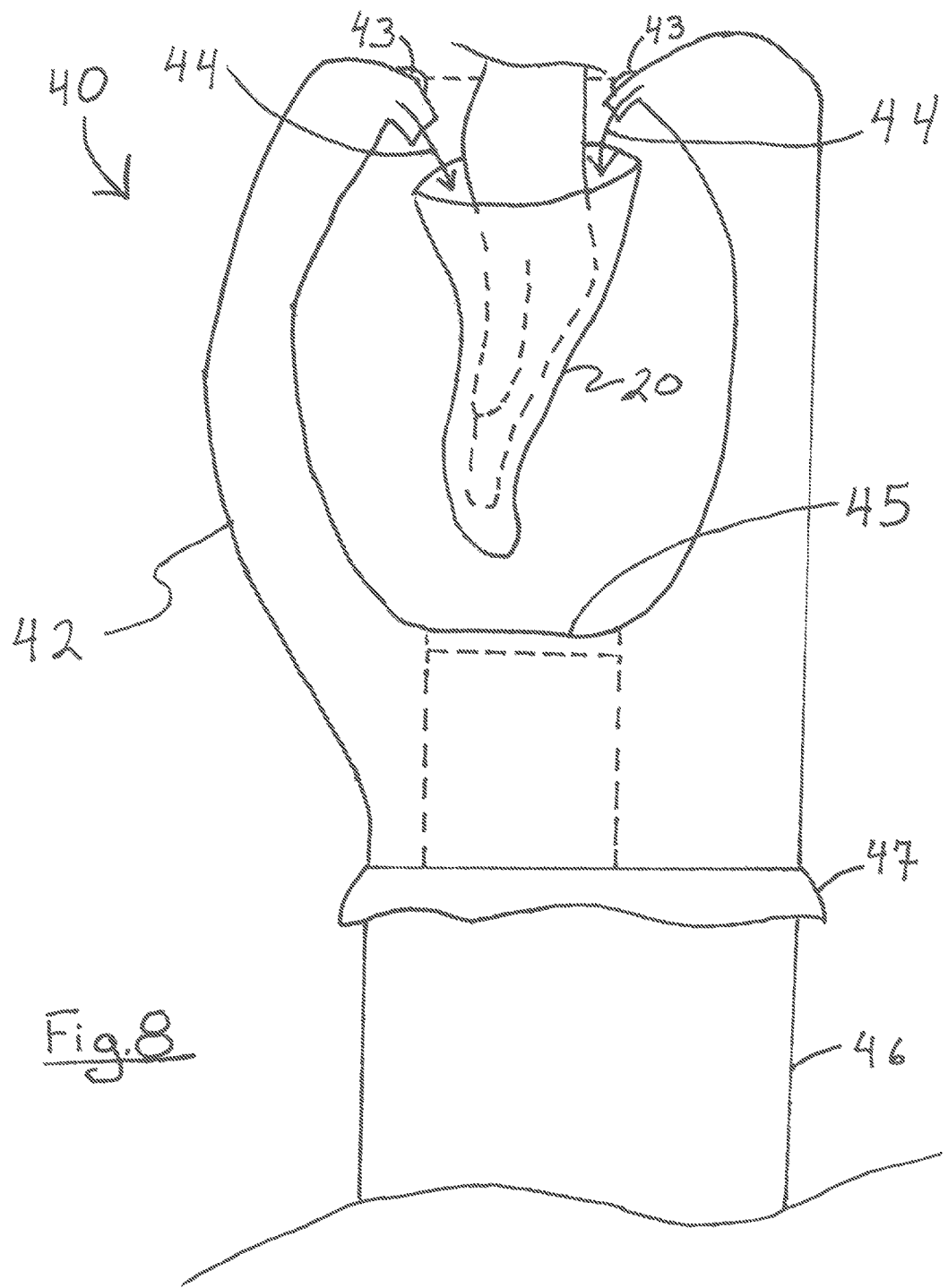
FIG. 8 is a partial cutaway illustrative of another embodiment of a disposal assembly in accordance with the present invention.

Further, and as shown best in FIG. 8, upon actuation, the forced air unit 42 of the disposal assembly 40 creates a directed airflow 44, and more in particular, a directed airflow 44 which is directed towards receptacle 46. As such, when an end user places his or her hands into forced air unit 42 while wearing one or more sanitary glove assembly 20, actuation sensor 43 actuates the forced air unit 42 creating a directed airflow 44 which enters into the open end of the one or more sanitary glove assembly 20 on the end user's hand, thereby forcing the sanitary glove assembly 20 off of the end user's hand and into receptacle 46 through discharge aperture 45.

In at least one embodiment, and a shown in FIG. 7, the disposal assembly 40 further comprises an advertisement media support 48, similar to advertisement media support 36 of the dispenser assembly 30. Also similar to advertisement media support 36, the advertisement media support 48 is dimensioned and configured to receive and display at least one replaceable advertisement media 49 which, as before, may comprise any combination of words, images, color schemes, phone numbers, addresses, URL's, etc., which the campaign sponsor wishes to convey to the end users at the target site about the sponsor's products, services, and/or cause.

Figure 9:
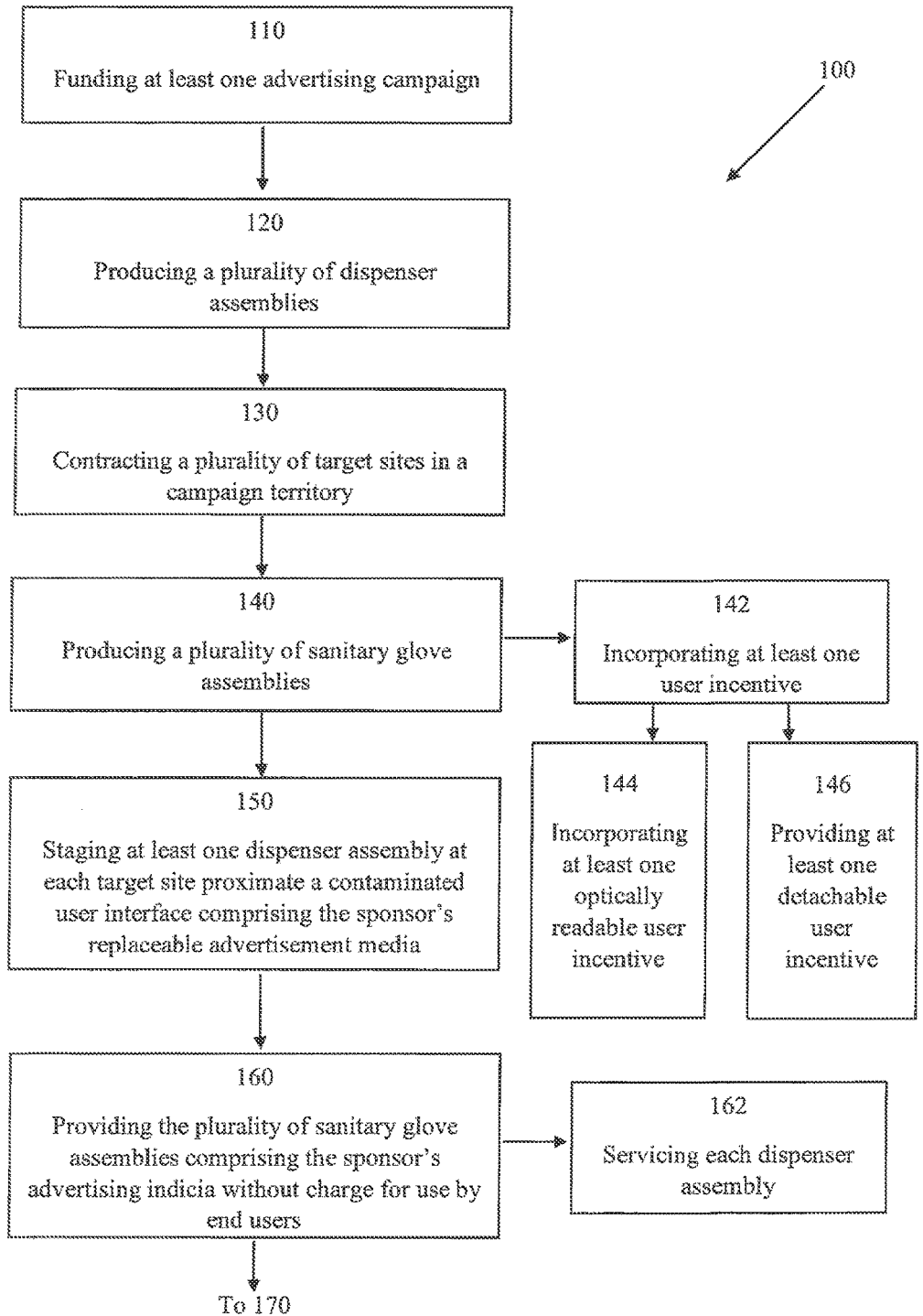
FIG. 9 is a diagrammatic representation illustrative of one embodiment of a marketing method in accordance with the present invention.
Figure 9:
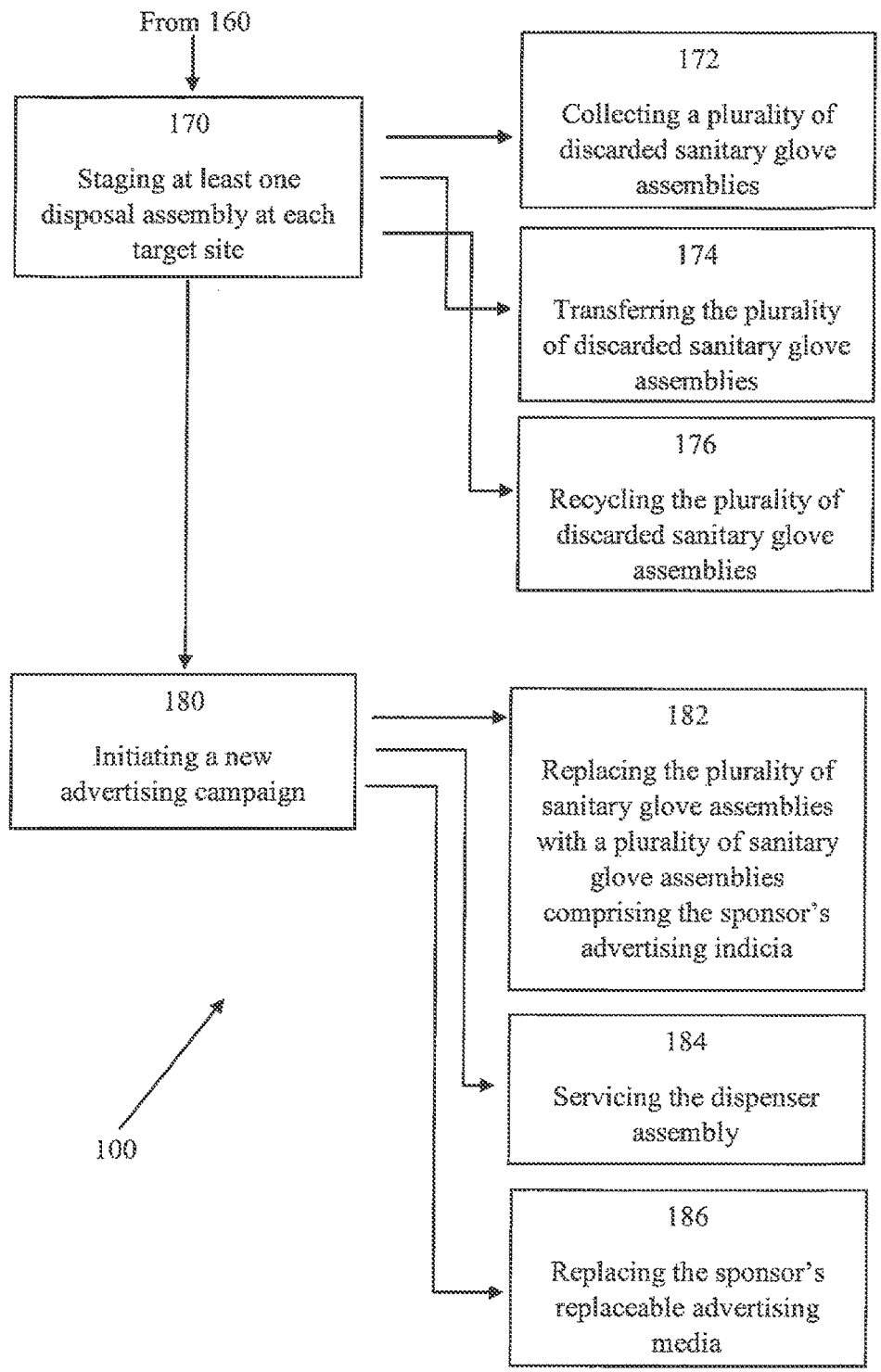

As stated above, the present invention is further directed to a marketing method, such as is generally depicted as at 100 in FIG. 9.

In at least one embodiment, the present marketing method 100 comprises funding at least one advertising campaign by a sponsor 110. Funding at least one advertising campaign by a sponsor 110, in one embodiment of the present invention, includes a campaign sponsor paying for the production of a plurality of sanitary glove assemblies comprising the sponsor's advertising indicia, paying for the production of a plurality of dispenser assemblies and a corresponding plurality of replaceable advertisement media depicting the campaign sponsor's message, and, in at least one further embodiment, paying for a plurality of disposal assemblies. Further the campaign sponsor will pay the cost of installing the dispenser assemblies, supplied with a plurality of sanitary glove assemblies, and disposal assemblies at one or more target sites throughout a campaign territory. As such, in accordance with this embodiment, end users are provided sanitary glove assemblies without cost to them or without cost to the proprietors of the target sites, such that the end user can prevent contact with one or more contaminated interfaces present at the target site.

In one alternate embodiment, funding at least one advertising campaign by a sponsor 110 comprises a campaign sponsor paying for the production of a plurality of sanitary glove assemblies comprising the sponsor's advertising indicia, and the cost of supplying one or more dispenser assemblies in the campaign territory with some of the plurality of sanitary glove assemblies having the campaign sponsor's advertising indicia.

The present marketing method 100 further comprises producing a plurality of dispenser assemblies comprising at least one advertisement media support 120. As described above, in at least one embodiment, a campaign sponsor will fund the production of the plurality of dispenser assemblies.

In at least one further embodiment, the present marketing method 100 comprises contracting a plurality of target sites in a campaign territory on which to stage at least one of a plurality of dispenser assemblies 130. In one embodiment, contracting the plurality of target sites 130 comprises producing, installing and servicing at least one dispenser assembly at each of a plurality of target sites, and supplying and servicing each of the plurality of dispenser assemblies with a plurality of sanitary glove assemblies comprises at least one advertising indicia selected by the campaign sponsor, at no cost to the proprietor of the target site. In one alternate embodiment, contracting a plurality of target sites on which to stage dispenser assemblies 130 comprises the proprietor of the target site contracting to pay for the production of the dispenser assemblies and the cost of installation of the same at its target site(s), while the campaign sponsor pays the cost of producing and supplying the plurality of sanitary glove assemblies to the dispenser assemblies at the target sites, once again, such that the sanitary glove assemblies are readily available at the target sites for use by end users without cost to the end users.

The present marketing method 100 further comprises producing a plurality of sanitary glove assemblies comprising the sponsor's advertising indicia 140. Once again, in at least one embodiment, a campaign sponsor will fund the production of the plurality of sanitary glove assemblies comprising the sponsor's advertising indicia 140. In one further embodiment, the present marketing method 100 comprises incorporating at least one user incentive 142 on at least some of the plurality of sanitary glove assemblies wherein, as before, the user incentive may comprise a refund, rebate, discount, etc., which the end user may redeem on his or her next purchase of the product, service and/or cause associated with the campaign sponsor's goals. In yet one further embodiment, the present marketing method 100 comprises incorporating at least one optically readable user incentive 144 on at least some of the plurality of sanitary glove assemblies, and in still another embodiment, the present marketing method 100 comprises incorporating at least one detachable user incentive 146 on at least some of the plurality of sanitary glove assemblies.

In one alternative embodiment, a user incentive is incorporated onto at least some of the plurality of sanitary glove assemblies wherein the user incentive is directly associated with goods and/or services provided by the proprietor of the target site, e.g., snacks or drinks from a gasoline station store, such that the end user is incentivized to conduct further business while at the target site. As will be appreciated, this also serves to incentivize a proprietor of a target site to contract for staging one of more dispenser assemblies on his or her site and/or to subsidize some or all of the cost of the plurality of sanitary glove assemblies dispensed therefrom.

The present marketing method 100 also comprises staging at least one dispenser assembly at each target site proximate a contaminated user interface 150. In at least one embodiment, the at least one dispenser assembly comprises the sponsor's replaceable advertisement media, and in one further embodiment, the dispenser assembly is supplied with a plurality of sanitary glove assemblies comprising the sponsor's advertising indicia.

At the heart of the present marketing method 100 is providing a plurality of sanitary glove assemblies comprising the sponsor's advertising indicia from each dispenser assembly without charge for use by end users 160. Specifically, by providing sanitary glove assemblies to end users via dispenser assemblies which are strategically located proximate contaminated interfaces which people are accustomed to contacting on a daily basis, and providing the sanitary glove assemblies without charge, creates a positive advertising environment in which the sponsor can more effectively convey its message to a plurality of end users.

At least one embodiment of the present marketing method 100 comprises servicing one or more dispenser assemblies 162 in order to maintain a supply of a plurality of sanitary glove assemblies comprising a sponsor's advertising indicia.

One embodiment of a marketing method 100 in accordance with the present invention comprises staging at least one disposal assembly at each target site in a campaign territory 170. Another embodiment of the present marketing method 100 further comprises collecting a plurality of discarded sanitary glove assemblies at each target site 172, transferring the plurality of discarded sanitary glove assemblies to a recycling facility 174, and/or recycling the plurality of discarded sanitary glove assemblies 176.

The marketing method 100 of the present invention further contemplates, in one embodiment, initiating a new advertising campaign for at least one dispenser assembly 180. More in particular, in at least one embodiment, initiating a new advertising campaign 180 includes replacing the replaceable advertising media with a new replaceable advertisement media 182. In addition, the present embodiment of the marketing method 100 comprises servicing one or more dispenser assemblies to maintain the supply of the plurality of sanitary glove assemblies comprising the new advertising indicia 184. In yet one further embodiment, initiating a new advertising campaign 180 includes replacing the plurality of sanitary glove assemblies with a plurality of sanitary glove assemblies comprising the new advertising indicia 186.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A marketing method implemented at one or more target sites comprising:
   funding an advertising campaign by a sponsor,
   producing a plurality of dispenser assemblies comprising at least one advertisement media support,
   contracting a plurality of target sites in a campaign territory on which to stage at least one of the plurality of dispenser assemblies, producing a plurality of sanitary glove assemblies comprising the sponsor's advertising indicia, staging at least one dispenser assembly at each target site proximate a contaminated user interface, wherein the at least one dispenser assembly comprises the sponsor's replaceable advertisement media and is supplied with a plurality of sanitary glove assemblies comprising the sponsor's advertising indicia without cost to the proprietors of the target sites, providing the plurality of sanitary glove assemblies comprising the sponsor's advertising indicia without charge for use by end users from each dispenser assembly, and servicing each dispenser assembly to maintain a supply of the plurality of sanitary glove assemblies comprising the sponsor's advertising indicia.

2. The marketing method as recited in claim 1 further comprising incorporating at least one user incentive on at least some of the plurality of sanitary glove assemblies.

3. The marketing method as recite in claim 1 further comprising staging at least one disposal assembly at each target site in a campaign territory.

4. The marketing method as recited in claim 1 further comprising collecting a plurality of discarded sanitary glove assemblies at the target site.

5. The marketing method as recited in claim 1 further comprising recycling a plurality of discarded sanitary glove assemblies to offset a cost of producing additional sanitary glove assemblies.

6. A marketing method implemented at one or more target sites comprising:

funding at least one advertising campaign by a sponsor, producing a plurality of dispenser assemblies comprising at least one advertisement media support, contracting a plurality of target sites for staging at least one of the plurality of dispenser assemblies, producing a plurality of sanitary glove assemblies comprising the sponsor's advertising indicia, incorporating at least one user incentive on at least some of the plurality of sanitary glove assemblies, staging at least one dispenser assembly at each target site proximate a contaminated user interface, wherein the at least one dispenser assembly comprises the sponsor's replaceable advertisement media and is supplied with a plurality of sanitary glove assemblies comprising the sponsor's advertising indicia without cost to the proprietors of the target sites, providing the plurality of sanitary glove assemblies comprising the sponsor's advertising indicia without charge for use by end users from each dispenser assembly, servicing each dispenser assembly to maintain a supply of the plurality of sanitary glove assemblies comprising the sponsor's advertising indicia, staging at least one disposal assembly at each target site in a campaign territory, collecting a plurality of discarded sanitary glove assemblies at each target site, transferring the plurality of discarded sanitary glove assemblies to a recycling facility, recycling the plurality of discarded sanitary glove assemblies, initiating a new advertising campaign for at least one dispenser assembly, replacing the replaceable advertising media with a new replaceable advertisement media, replacing the plurality of sanitary glove assemblies comprising the advertising indicia with a plurality of sanitary glove assemblies comprising the new advertising indicia, and servicing the dispenser assembly to maintain the supply of the plurality of sanitary glove assemblies comprising the new advertising indicia.

* * * * *